March 11, 1930.　　　J. B. HENDRICKSON　　　1,749,765
APPARATUS FOR ELECTRIC WELDING
Filed March 13, 1926　　　2 Sheets-Sheet 2
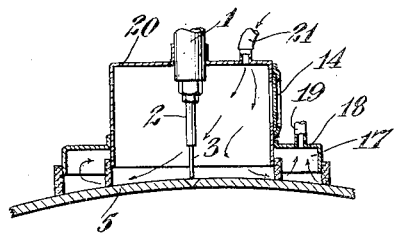
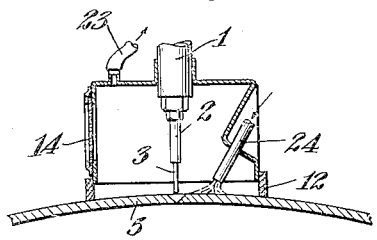
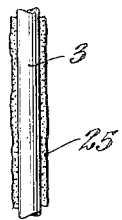
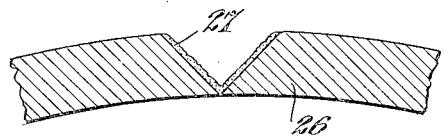
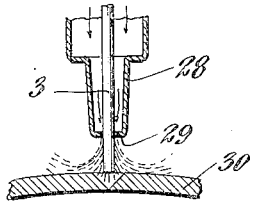
Inventor
John B. Hendrickson
By his Attorneys Patented Mar. 11, 1930

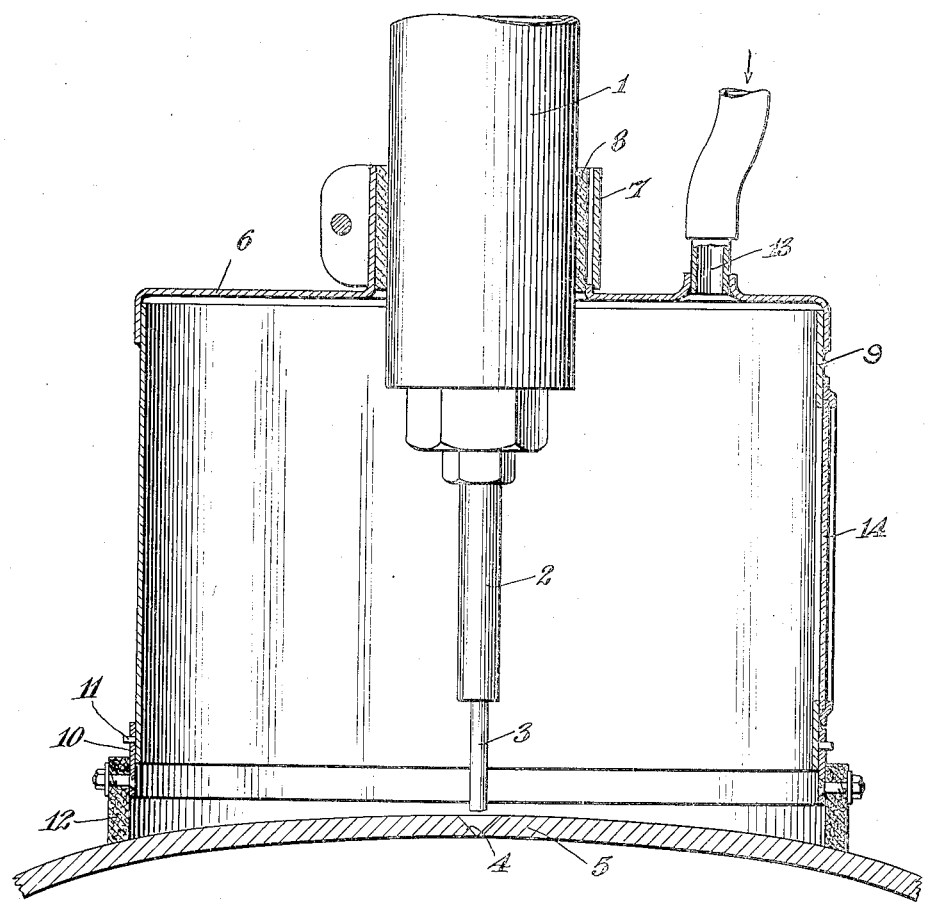

1,749,765

UNITED STATES PATENT OFFICE

JOHN B. HENDRICKSON, OF PHILADELPHIA, PENNSYLVANIA, ASSIGNOR TO WELDING ENGINEERS INCORPORATED, A CORPORATION OF DELAWARE

APPARATUS FOR ELECTRIC WELDING

Application filed March 13, 1926. Serial No. 94,380.

This invention relates to welding and more particularly to an apparatus and method for preventing oxidation of material adjacent the portion which is being welded.

In welding joints or the like any oxidation of either the welding material or of the material being welded produces very harmful effects in the weld, such for instance, as causing various degrees of porosity in the welding material or in other ways to weaken the welded joint.

It is an object of my invention to provide an improved method and apparatus for excluding oxidizing substances, of which oxygen in the atmosphere is the most important. More specifically, it is an object of the invention to exclude the air from the immediate vicinity of the weld and to do so with the use of a suitable gas.

Other objects and advantages of my invention will be apparent from the following description of the accompanying drawings, in which Fig. 1 is a partial sectional view of welding equipment and one form of my improved apparatus associated therewith;

Fig. 2 is another form of apparatus embodying my invention;

Fig. 3 is a further modification;

Fig. 4 is a further form of my invention wherein the welding material is coated with a suitable gas producing substance;

Fig. 5 is a sectional view showing said substance placed on joints to be welded prior to the welding operation;

Fig. 6 is a further modification showing an inert and incombustible gas flowing downwardly and outwardly around the welding material.

In the illustrative embodiment of my invention I have shown a usual part 1 of a welding head, of the electric type, from which projects a guiding tube 2 for welding material in the form of a rod 3. The welding material is adjusted by suitable means in relation to the seam 4 of a tank wall 5 to be welded. While a fragment of a tank has been shown, the invention is, of course, applicable to any other type of article to be welded. To exclude air from the welded joint there is provided means for enclosing the welding rod 3. In one form this means constitutes a top portion 6 having a flange held to the part 1 by a suitable clamp 7. The various elements are made of heat-resisting or incombustible material, although of such a nature as to conduct and radiate quickly any heat generated within the hood, thereby keeping the various welding elements as cool as possible. Suitable material 8 may be interposed between the flange and the part 1, which material may be asbestos or any other suitable insulating and preferably leak-proof material. A preferably cylindrical side 9 secured to the top 6 has, preferably, removably secured thereto an apron attachment. This apron comprises a band 10 having a series of bayonet openings whereby the band may be removably secured to a series of pins 11 carried by the side 9. Secured to the band 10 is a piece of leak-proofing material 12, which may be of asbestos or other suitable material which will conform to any irregularities on the surface of the tank 5. Preferably the lower edge of the member 12 will be cut to the general shape of the tank surface and due to the preferable flexibility of the member 12 the same will conform most exactly to the tank surface. Accordingly, air will be excluded, although by passing a gas through an inlet opening 13 the actual welding will be enclosed within this body of gas, which if subjected to a high enough pressure will be forced out underneath the lower edge of the member 12. The circulation of gas thus produced, for example, passing in the inlet 13 and out under the member 12 will insure a high degree of exclusion of air and reduce to a minimum any possibility of air leaking in under the lower edge of member 12. The gases used might be termed as inert in that they are inert as to being combustible in regard to their action toward iron, steel or other metal during welding. Such gases would be hydrogen and illuminating gases, although gases which are inert as far as being incombustible in any way could also be used. In order to watch the process of welding a suitable window 14 is provided in the side 9.

In Fig. 2 there is shown a modification